US007242292B2

(12) United States Patent
Berezowski et al.

(10) Patent No.: US 7,242,292 B2
(45) Date of Patent: Jul. 10, 2007

(54) INFRARED COMMUNICATION SYSTEM AND METHOD

(75) Inventors: Andrew G. Berezowski, Wallingford, CT (US); Mark C. Bohanon, Aurora, IL (US); Daniel C. Hawkinson, Elburn, IL (US); Dominick A. Testa, St. Charles, IL (US)

(73) Assignee: Honeywell International, Inc., Morristown, NJ (US)

( * ) Notice: Subject to any disclaimer, the term of this patent is extended or adjusted under 35 U.S.C. 154(b) by 181 days.

(21) Appl. No.: 10/733,929

(22) Filed: Dec. 11, 2003

(65) Prior Publication Data

US 2005/0128079 A1 Jun. 16, 2005

(51) Int. Cl.

| | |
|---|---|
| ***G05B 23/02*** | (2006.01) |
| ***G09F 25/00*** | (2006.01) |
| ***G08B 3/00*** | (2006.01) |
| ***G08B 5/00*** | (2006.01) |
| ***G08B 1/00*** | (2006.01) |
| ***G08B 23/00*** | (2006.01) |
| ***G08B 1/08*** | (2006.01) |

(52) U.S. Cl. ............. 340/539.11; 340/3.1; 340/286.01; 340/328; 340/331; 340/332; 340/500; 340/517; 340/531; 340/539.26; 340/691.1; 340/691.4; 340/691.6

(58) Field of Classification Search ................ 340/540, 340/627–632, 577, 291, 539.11, 539.26, 328–332, 340/500–539.1, 691–693, 3.1, 286.01; 455/7; 370/216–228, 409
See application file for complete search history.

(56) References Cited

U.S. PATENT DOCUMENTS

| | | | | |
|---|---|---|---|---|
| 4,812,821 | A * | 3/1989 | Santy et al. | 340/538 |
| 5,448,230 | A * | 9/1995 | Schanker et al. | 340/870.03 |
| 5,594,410 | A * | 1/1997 | Lucas et al. | 340/332 |
| 5,982,291 | A * | 11/1999 | Williams et al. | 340/635 |
| 6,046,978 | A * | 4/2000 | Melnik | 370/221 |
| 6,480,109 | B1 * | 11/2002 | Tice | 340/506 |
| 6,597,288 | B2 * | 7/2003 | Amano et al. | 340/628 |
| 6,741,174 | B2 * | 5/2004 | Rhoades et al. | 340/540 |
| 6,794,991 | B2 * | 9/2004 | Dungan | 340/632 |
| 6,828,909 | B2 * | 12/2004 | Script et al. | 340/545.1 |
| 6,838,988 | B2 * | 1/2005 | Lennartz et al. | 340/539.26 |
| 6,873,256 | B2 * | 3/2005 | Lemelson et al. | 340/539.1 |
| 6,970,077 | B2 * | 11/2005 | Johnson et al. | 340/500 |
| 7,030,752 | B2 * | 4/2006 | Tyroler | 340/531 |

OTHER PUBLICATIONS

Section 18 of System Sensor Design Guide for Eclipse Fire Alarm Protocol, Aug. 23, 2002, pp. 117-131, Issue 2.01.

* cited by examiner

*Primary Examiner*—Daniel Wu
*Assistant Examiner*—Lam Pham
(74) *Attorney, Agent, or Firm*—Welsh & Katz, Ltd.

(57) ABSTRACT

A wireless communications capability enables field personnel to communicate with a remote control console of a distributed system. A hand held communications unit generates console related messages that are coupled, via local devices, to the remote console.

5 Claims, 1 Drawing Sheet

INFRARED COMMUNICATION SYSTEM AND METHOD

FIELD OF THE INVENTION

The invention pertains to communications capabilities in monitoring or alarm systems. More particularly, the invention pertains to systems and methods enabling installers or maintenance personnel in a region being monitored, to easily communicate with a control panel of the monitoring or alarm system.

BACKGROUND

Regional monitoring systems, such as fire alarm systems, have a variety of components which are scattered through the region being monitored. These include ambient condition detectors such as smoke detectors, flame detectors, thermal detectors or gas detectors which are often monitored at or near a ceiling of part of the region being monitored. Other types of devices such as pull-stations, sensors for doors or windows or the like or other building monitoring sensors may be dispersed throughout the region being monitored at various locations including on the walls, adjacent to doors or windows or the like. Such devices are usually coupled by either a wired or wireless medium to a common or central control unit or panel.

The common control unit or panel might not be located in that part of the region being monitored. Instead, it might be installed, for example, in a lower level of a multi-level building along with other building control functions. This location might be substantially displaced from some or all of the devices of the system. In some installations, the control unit might be in RF communication with an installed system, or in communication via a computer network.

It has been recognized that because of the physical displacement of the various devices, servicing, maintenance or installation activities often require interaction between the personnel out in the region carrying out the activity and the personnel at or near the control unit. This communication, in known systems, is often carried out using a separate wireless communication system, such as RF walkie talkies.

Other systems which are installed in the region, such as security systems, often require feedback from personnel traveling through the region. Representative of these are security personnel or guard check in stations which are distributed throughout the region for purposes of tracking progress of security personnel on their rounds. Historically, this has resulted in installation of a completely separate set of equipment to carry out this function.

It would be desirable to be able to improve communication efficiency between the field personnel in the region being monitored and the control room for the region. Further, it would be desirable if such functionality could be incorporated into systems which are to be installed in the region, either initially or as after the fact upgrades to take advantage of existing communication capabilities of regional monitoring systems. Preferably, also such functionality could be incorporated without substantially increasing system costs or installation complexity.

DESCRIPTION OF THE PREFERRED EMBODIMENTS

Figure 1:
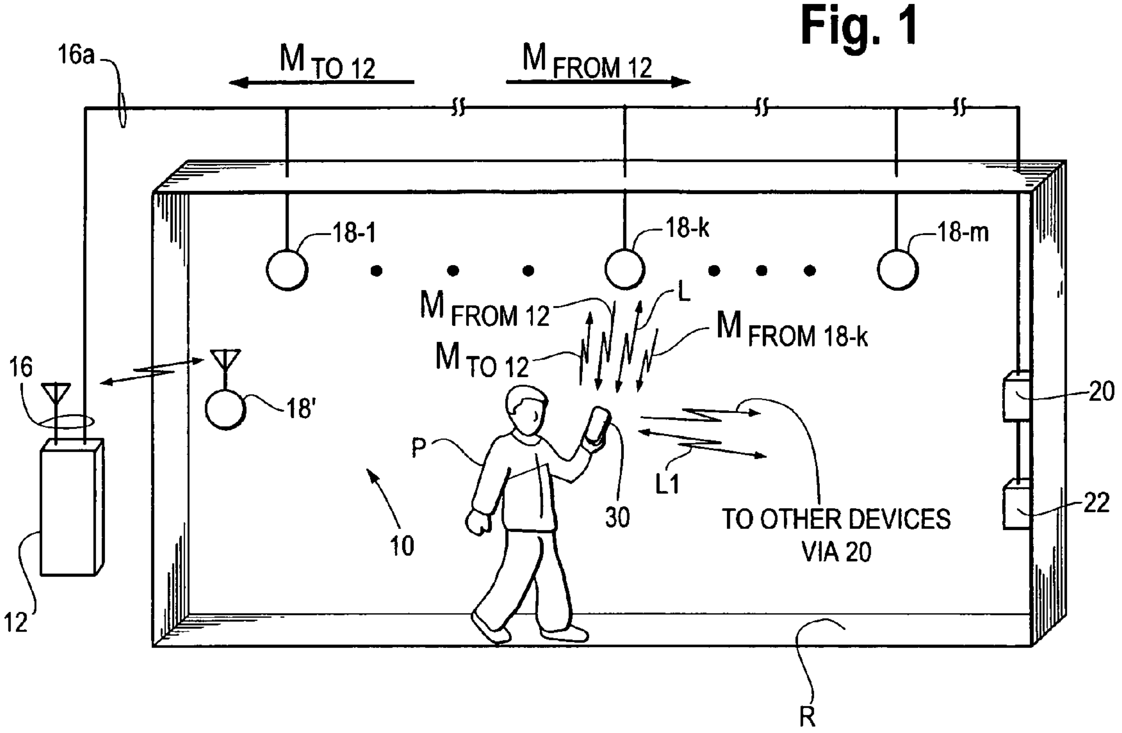
FIG. 1 is a system in accordance with the invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

A communication system and method in accordance with the invention can facilitate and improve communications between personnel in a region being monitored and a monitoring system control unit or console. In this regard, the person or persons in the region can use a wireless hand-held communication device to signal the control console or panel via any one of a plurality of electrical devices, in the region, which are in communication with the control console via a wired or wireless medium. Without limitation, one suitable wireless medium is found in the infrared frequency band.

In one embodiment a regional monitoring system, such as a fire alarm system, includes a plurality of devices such as ambient condition detectors, pull stations, output modules and the like. Some or all of these devices can incorporate an infrared sensor for receipt of communications signals from a hand-held device carried by operational personnel in the region. Incoming messages from the hand-held device can be recognized at the receiving device as messages to be forwarded to the common control element or any other identified device(s). The messages can then be forwarded via a wired or wireless medium used by the receiving device to communicate with the common control element or the other identified devices.

Feedback can be provided to the field personnel by having the receiving device emit either an audible or a visual signal, either in response to receiving a communication from the field personnel, or in response to receiving a message from the control element after it has received the subject communication. Representative hand-held communication units can incorporate bi-directional infrared transmission/reception capabilities which also make it possible for the system control element to communicate directly with the field personnel via the receiving device.

In yet another embodiment, security personnel can carry the infrared communication device. As they traverse the region making their rounds, they can check in using that device at detectors, pull stations or other devices which are part of the regional monitoring system. In this mode, a record can be created at the common control element or panel indicative of the time and location of receipt of the message from the security personnel.

Service or maintenance personnel can use the same communication instrument to communicate with the common control element while conducting maintenance or testing of system devices scattered throughout the region. Alternately, any of the other devices in the system can be communicated with in the same way.

The communication is sent from the hand-held device to the device which can be a detector, pull station or other type of input/output module. The receiving device can not only send a message, via its communication medium, to the control element, it can also respond to the message by, for example, conducting a self-test or the like. Results of the executed function can be transmitted back to the hand-held unit as well as to the common control element.

In yet another aspect of the invention, the messages from the hand-held unit can be directed not only to the common control element, they can also be directed to any and all other system devices in the region. For example, if its desirable to carry out a group self-test function such as causing a group of strobe units to trigger in unison, that message can be sent from the hand-held unit via a nearby device, through a system communication medium to the relevant group of output devices which can then carry out the desired function as a group. Those of skill will understand that the above enumerated are exemplary only and not limitations of the invention.

In yet another embodiment, a peer-to-peer communication system incorporates a plurality of nodes. The nodes can communicate with one another. A portable wireless unit can be used to transmit a wireless communication to a receiving node. The receiving node determines the intended recipient. If the intended recipient is different, the receiving node forwards the communication to the intended node(s).

FIG. 1 illustrates a region R being monitored by elements of a system 10 in accordance with the invention. The system 10 includes a common control element 12 which may in fact be displaced away from the region R. For example, the region R can be one of a plurality of floors in a multiple floor building with the control element 12 located in the basement of the subject building.

The control element 12 is in wired or wireless communication via medium 16 with a plurality of devices. The devices include a plurality of ambient condition detectors 18, some or all of which might be ceiling mounted. Other detectors, such as detector 20 might be mounted on a wall to detect door or window openings or closings or the presence of individuals in the region R for security purposes.

In one embodiment, the system 10 could be implemented as a fire detection system. Devices 18 could be, for example, be implemented as fire or smoke detectors. Device 20 could be implemented as a gas detector. Control circuits 12, which could be implemented as least in part, with one or more programmable processors and associated executable instructions could also include graphical output devices to advise an operator as to the source of communications discussed subsequently.

Other devices such as pull stations 22 could also be in communication with control element 12 via medium 16. It will be understood that medium 16 could in fact include multiple wired or wireless communications paths depending on the type of device which is in communication with the control element 12.

A person P in the region R carries a portable infrared communication device 30 which can be in either unidirectional or bi-directional communication with any of devices 18, 20 or 22 without limitation. The person P can direct the communication unit 30 to send an appropriate message, such as M to 12, via the infrared link to device 18-*k* for example, which message is intended for the control element 12.

The receiving device 18-*k* upon analyzing the received communication via the link L can determine from the message format that it is to be communicated to the control element 12. Control circuits 12 could respond to the message and reply to unit 30, message M from 12, via medium 16 and device 18-*k*. Alternately, the message format might also direct the device 18-*k* to respond to the unit 30, M from 18-*k*, and/or cary out some other function, all without limitation.

As yet another alternate, the communication device 30 can direct a message L1 at a wall mounted device such as sensor 20 or pull station 22 or any other input or output device in the region R to indicate time and location while making security rounds. Other messages transmittable from the unit 30 will cause the respective receiving device, such as detector or sensor 20 to carry out a self-test function as well as to communicate with the control element 12 as to the existence of the test and the results thereof.

In an analogous fashion, person P can communicate with any other device(s) in the system 10. For example, a transmission from unit 30 to device 18-*k* could be directed, via medium 16 to device 18-*m* (which could be located on another floor of region R). Alternately, person P could communicate with wireless device 18' by directing an initial transmission at device 22.

While the above system and method have been described in connection with infrared transmission medium, it will be understood that other transmission mediums without limitation can be used. These will include RF as well as sonic or ultrasonic, all without limitation. It will also be understood that a variety of modulation schemes as well as communication protocols can be used without departing from the spirit and scope of the present invention.

Figure 2:
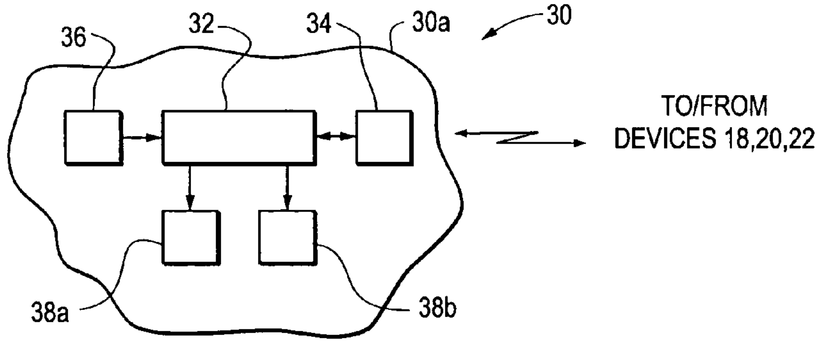
FIG. 2 is a block diagram of an exemplary hand-held control device in accordance with the invention.

FIG. 2 is a block diagram of a representative hand-held, portable communication unit 30. The unit 30 includes control circuitry 32 which is coupled to a transmitter/receiver 34 for the purpose of transmitting and receiving wireless signals in the appropriate protocol.

Control circuits 32 can receive manual inputs from a keyboard touch screen or other type of input device 36. Control circuits 32 can also provide audible and visual outputs to the user via display 38*a* and audible output device 38*b*. Field personnel can conveniently carry the unit 30 which is self contained in a housing 30*a*.

Figure 3:
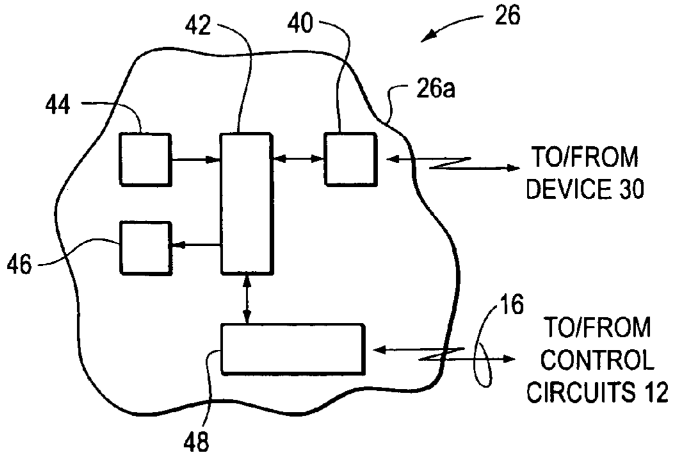
FIG. 3 is a block diagram of an exemplary device which could be installed in the system of FIG. 1.

FIG. 3 is a block diagram of a representative one of the devices of the system 10. The device 26 has a housing 26*a* and can include a wireless transmitter/receiver 40 compatible with the transmitter/receiver 34 of the hand-held device 30. The transmitter/receiver 40 is in turn coupled to control circuitry 42. Control circuitry 42 could be of a type which would be understood by those of skill in the art and include both hardwired circuitry as well as a programmable processor and pre-stored executable control instructions.

Control circuitry 42 can in turn be coupled to one or more of optional elements such as sensor (s) 44 as well as control output devices 46 which can include relays, solenoids, motors, audible output devices, visual output devices and the like, all without limitation. Device 26 also incorporates interface circuitry 48 coupled to control circuits 42 to carry out a communication function via medium 16, which can be wired or wireless.

It will be understood that the above description is exemplary only. Other embodiments come within the spirit and scope of the present invention. For example, the present communication function can be implemented in a security system or any other type of system with distributed devices that communicate via a medium. Other exemplary types of systems that come within the spirit and scope of the invention include peer-to-peer systems that might not have a common control console.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A system comprising:

a plurality of spaced apart nodes, the nodes each include communications circuitry and can communicate with one another via a medium;

at least some of the nodes each include a receiver of wireless communications from a displaced source and circuitry for determining if the respective receiving node is a final recipient of a received communication where, at least some of the nodes include at least one sensor selected from a class which includes heat sensors, flame sensors, smoke sensors and gas sensors with one of the nodes comprising a common control element where the common control element includes a graphical output device for operator information;

where the receiver of wireless communications includes a second sensor of incident radiant energy;

a portable source of radiant energy signals; and where the portable source includes circuitry for specifying a message recipient.

2. A system as in claim 1 where the portable source includes circuitry for specifying a selected message.

3. A system as in claim 2 where the portable source includes circuitry for receiving communications from at least a selected node.

4. A system as in claim 3 where the received communications include node test results.

5. A system as in claim 2 where the selected message is selected from a class which includes at least a message designating a test, a group self-test, a message designating a time, or a message designating a location.

* * * * *